United States Patent [19]
Clark et al.

[11] 3,857,015
[45] Dec. 24, 1974

[54] ELECTRICALLY HEATED HEAT SEALING IMPLEMENT

[75] Inventors: Glenn W. Clark, Topeka, Kans.;
Oliver F. Richardson, 6223 Rex Dr., Dallas, Tex.

[73] Assignees: Oliver F. Richardson, Dallas, Tex.;
Shirley Fleshman, Oklahoma City, Okla.

[22] Filed: Nov. 8, 1972

[21] Appl. No.: 304,600

[52] U.S. Cl. .................. 219/244, 29/110.5, 38/100, 128/24.3, 156/579, 156/583, 219/240, 219/241
[51] Int. Cl. ........................ H05b 1/00, D06f 75/00
[58] Field of Search .......... 219/228, 240, 244, 241; 15/230.11; 38/100, 101, 76; 29/110.5; 128/56, 57, 24.3, 24.4; 401/197, 208; 156/583, 579, 582; 126/24.3, 56

[56] References Cited
UNITED STATES PATENTS

| | | | |
|---|---|---|---|
| 1,268,990 | 6/1918 | Moeller | 219/244 |
| 1,596,181 | 8/1926 | Hills | 219/244 X |
| 2,339,492 | 1/1944 | Lewis | 219/244 X |
| 2,401,820 | 6/1946 | Fairley | 38/100 X |
| 2,507,736 | 5/1950 | Ritchie et al. | 219/240 |
| 2,667,561 | 1/1954 | Schoenwald | 219/240 |
| 3,283,395 | 11/1966 | Rownd | 156/583 |

FOREIGN PATENTS OR APPLICATIONS

| | | | |
|---|---|---|---|
| 599,231 | 10/1959 | Italy | 128/57 |

*Primary Examiner*—A. Bartis
*Attorney, Agent, or Firm*—Jerry J. Dunlap

[57] ABSTRACT

An improved thermoplastic material heat sealing implement comprising a roller assembly having a hollow cylindrical roller base that has a roller contacting surface formed about the outer surface of the roller, the contacting surface being constructed of a material that substantially reduces adhesion between the thermoplastic material and the roller contacting surface. A bearing member is provided at each end of the roller base, and the roller assembly is rotatingly supported in roller support means that features upper and lower support elements that engage and support a portion of each bearing member, and form a handle portion for the heat sealing implement. A heating element is disposed within the hollow of the roller base and cooperates with conductor means partially disposed within the handle.

A heat control assembly is provided that has a start position applying a relatively large amount of heat to the roller contacting surface to elevate the temperature level thereof to a predetermined operating temperature level and an operating position maintaining the roller contacting surface generally at the operating temperature level during the operation of the heat seal implement. Adjustable posts are secured to a portion of the roller support assembly for supporting the roller assembly in an elevated position.

6 Claims, 7 Drawing Figures

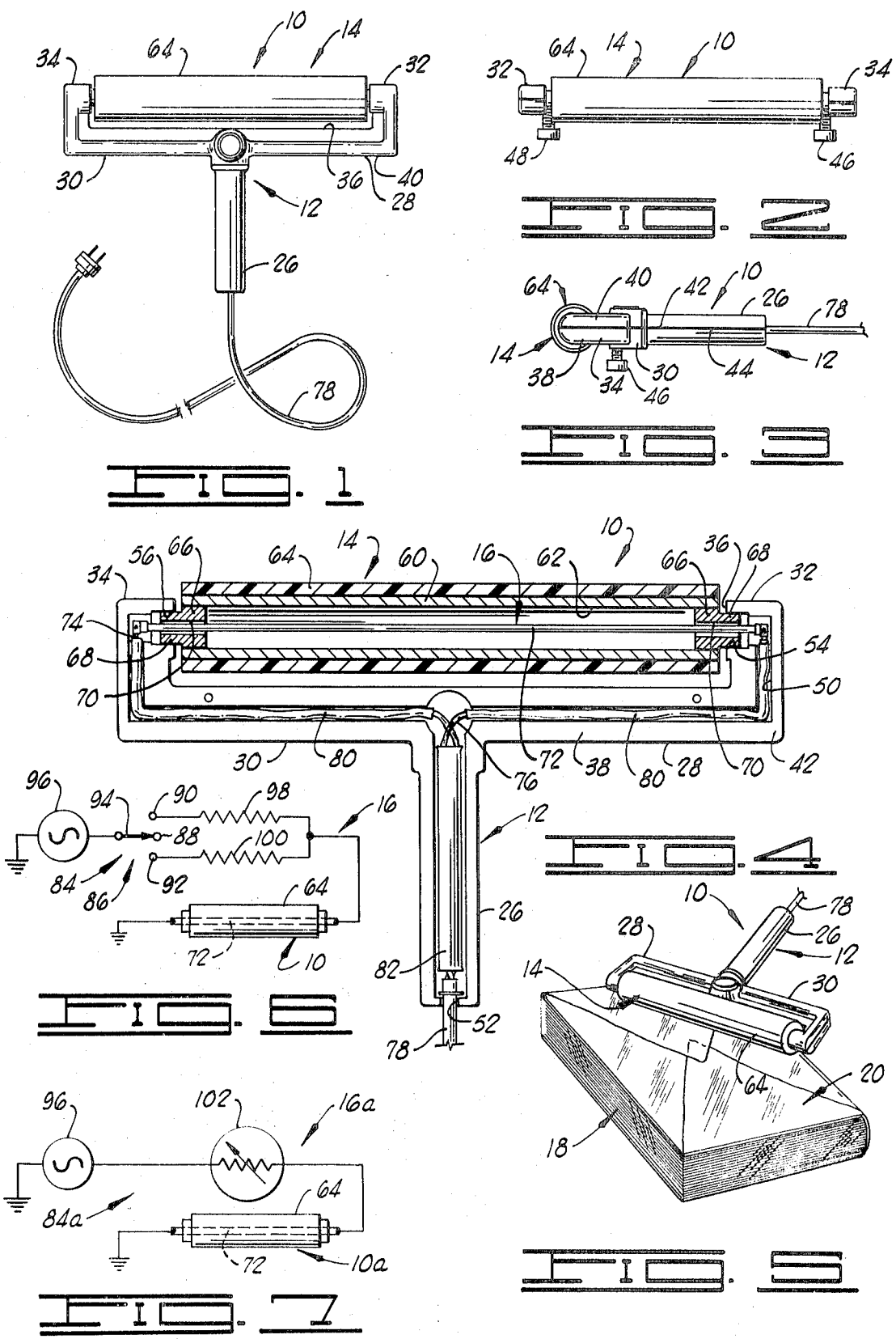

ELECTRICALLY HEATED HEAT SEALING IMPLEMENT

BACKGROUND OF THE INVENTION

1. Field of the Invention

This invention relates generally to improvements in heat applicators and, more particularly, but not by way of limitation, to an improved heat seal implement for sealing a thermoplastic wrapping material or the like generally about relatively small mercantile items.

2. Description of the Prior Art

In the past, there have been various devices constructed to apply heat to various types of articles or materials via an operator-held implement. One type of heat sealing device proposed in the past was disclosed in the U.S. Pat. No. 2,598,900, issued to Frye, this particular device being constructed for bonding two or more layers of a thermoplastic material via heat fusion. The heat sealing device disclosed in the Frye patent included a heated ball, or, in one form, a heated roller supported on one end of an operator-held handle and positioned for contacting the material to be sealed and applying heat thereto during the operation thereof.

The U.S. Pat. No. 1,596,181, issued to Hills, disclosed a sadiron utilized in pressing, straightening or finishing operations, having an electrically heated roller pivotally mounted on one end of a handle which was constructed to function in a lever-like manner during the operation of the sadiron, the handle being tubular shaped to accommodate the electrical conductors connected to the heating element disposed generally within a hollow portion of the roller. The U.S. Pat. No. 2,401,820, issued to Fairley, disclosed an electric roller iron having a heating element disposed within the hollow portion of a roller operating in a manner similar to that described before with respect to the Hills patent, the Fairley patent including a rheostat control element. A device similar to the above-mentioned devices was disclosed in the U.S. Pat. No. 1,268,990, issued to Moeller.

Various other types of devices have been constructed in the past which included heating elements and, in some instances, heated rollers contacting a particular material or part for applying heat thereto for various reasons. Typical of the last-mentioned devices are the portable laminater disclosed in the U.S. Pat. No. 2,339,492, issued to Lewis, and the U.S. Pat. No. 2,709,742, issued to Perry, for example.

OBJECTS OF THE INVENTION

An object of the present invention is to provide a heat seal implement for applying heat and sealing a wrapping material generally about relatively small mercantile items or the like in a more efficient and more economical manner.

Another object of the invention is to provide an improved method and apparatus for encompassingly wrapping relatively small mercantile items with a wrapping material.

One other object of the invention is to provide an improved heat seal implement which can be assembled and disassembled in a relatively fast, efficient and more economical manner.

Yet another object of the invention is to provide an improved heat seal implement having a substantially reduced coefficient of friction with respect to a wrapping material to be sealed thereby.

Another object of the invention is to provide an improved heat seal implement which can be positioned in an operating position in a relatively fast, efficient and economical manner.

A still further object of the invention is to provide an improved method and apparatus for applying heat to a wrapping material which is economical in the construction and the operation thereof.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a top plan view of a heat seal implement constructed in accordance with the present invention.

FIG. 2 is a front elevational view of the heat seal implement of FIG. 1.

FIG. 3 is a side elevational view of the heat seal implement of FIG. 1.

FIG. 4 is a top plan view of the heat seal implement of FIG. 1, having the upper roller support removed therefrom and showing a cross-sectional view of the roller assembly.

FIG. 5 is a diagrammatic, perspective view showing the heat seal implement of the present invention in an operational position applying heat for sealing a wrapping material generally about a small mercantile item, more particularly, a book.

FIG. 6 is a schematic view of the heat control assembly of the heat seal implement of the present invention.

FIG. 7 is a schematic view, similar to FIG. 6, but showing a modified heat control assembly.

DESCRIPTION OF THE PREFERRED EMBODIMENT

Referring to the drawings in general, and to FIGS. 1 through 4 in particular, shown therein and designated by the general reference numeral 10 is a heat seal implement for applying heat and sealing a heat sealable wrapping material generally about a relatively small mercantile item constructed in accordance with the present invention. The heat seal implement 10 generally includes a roller support assembly 12; a roller assembly 14 rotatingly supported via a portion of the roller support assembly 12; and a heat assembly 16 having a portion positioned in heating proximity with respect to a portion of the roller assembly 14 and a portion constructed to position the heat seal implement at a predetermined operating temperature level in a relatively fast, efficient and more economical manner, for reasons and in a manner to be made more apparent below.

In general, the heat seal implement 10 is constructed to facilitate and effect the sealing of a thermoplastic wrapping material or the like generally about an item to be wrapped and, more particularly, such that small mercantile items such as books, for example, can be encompassingly wrapped via a thermoplastic wrapping material or the like.

In general, the heat seal implement 10 is constructed to facilitate the wrapping of small mercantile items with a film-like, heat sealable, flexible wrapping material of the type generally referred to in the art as a thermoplastic type of wrapping material and, more particularly, of the type referred to as a polyvinylchloride (PVC) type of wrapping material. It should be noted that the thermoplastic, polyvinylchloride (PVC) wrapping material is also preferaby of the type which shrinks in response to the application of heat thereto, the wrapping material being sealed and shrink-fitted about the mercantile item via the heat seal implement 10.

In this particular, last-mentioned application, the mercantile item, such as the book, for example, (shown in FIG. 5 and designated therein via the general reference numeral 18), is initially encompassingly wrapped with a sheet of the wrapping material (the wrapping material being shown in FIG. 5 and designated therein via the general reference numeral 20). After the mercantile item 18 is wrapped with the wrapping material 20, the heat seal implement 10 is activated to heat a contacting portion thereof to a predetermined, operating temperature level, the heat seal implement 10 being then moved into an operating position with respect to the wrapped mercantile item 18 wherein the heated surface of the heat seal implement 10 engages the wrapping material 20. The heated surface of the heat seal implement 10 is then moved over the wrapping material 20 wrapped about the mercantile item 18, the heated contacting surface of the heat seal implement 10 engaging and applying heat to the wrapping material 20 sealing the overlapping portions of the wrapping material 20 and shrinking the wrapping material 20 generally about the mercantile item 18. The heat seal implement 10 thus provides a relatively fast, convenient, efficient and economical means for packaging relatively small mercantile items, particularly useful in applications requiring the packaging of relatively small volumes of such mercantile items on an intermittent basis.

The roller support assembly 12 of the heat seal implement 10, more particularly, includes a tubularshaped handle portion 26 shaped for gripping engagement by an operator during the operation of the heat seal implement 10 and a pair of arm portions 28 and 30 formed on one end of the handle portion 26, the arm portions 28 and 30 extending in opposite directions generally perpendicularly from the end of the handle portion 26, as shown more clearly in FIGS. 1 and 4. An arm extension 32 is formed on the end of the arm portion 28, opposite the end thereof formed on the handle portion 26, the arm extension 32 extending a distance generally perpendicularly from the arm portion 28. An arm extension 34 is formed on the end of the arm portion 30, opposite the end of the arm portion 30 formed on the handle portion 26, the arm extension 34 extending a distance generally perpendicularly from the arm portion 30. The arm portions 28 and 30 and the arm extensions 32 and 34 formed thereon are positioned and shaped to form a U-shaped roller receiving opening 36, a portion of the roller assembly 14 being rotatingly supported within a portion of the roller receiving opening 36 in an assembled position of the heat seal implement 10, for reasons and in a manner to be made more apparent below.

In a preferred form, as shown more clearly in FIGS. 3 and 4, the handle portion 26, the arm portions 28 and 30 and the arm extensions 32 and 34 are integrally formed, and the roller support assembly 12 is split generally along a horizontal centerline thereof forming a lower support element 38 and an upper support element 40. The lower support element 38 has an upwardly facing mating surface 42 and the upper support element 40 has a downwardly facing mating surface 44, each of the mating surfaces 42 and 44 being disposed generally in a coplanar disposition and extending along the horizontal centerline splitting the roller support assembly 12 into the lower support element 38 and the upper support element 40. In an assembled position, the upper support element 40 is positioned on the lower support element 38 such that the mating surfaces 42 and 44 matingly engage, the lower and the upper support elements 38 and 40 being secured in this position to form the assembled roller support assembly 12.

A pair of adjustable posts 46 and 48 are threadedly secured in a portion of the lower support element 38, each post 46 and 48 being positioned generally on opposite sides of the roller assembly 14. The end of each post 46 and 48, opposite the ends threaded in the support element 38, is positioned for engaging a support surface such as a table top or the like, for example, supporting the heat roller a distance above the support surface in a non-operative, safe position during one aspect of the operation of the heat seal implement 10.

In a preferred form, as shown in the drawings, the lower and the upper support elements 38 and 40 are each separate, integrally formed elements, and each is shaped and formed such that the various components and assemblies of the heat seal implement 10 can be positioned in an assembled position in the lower support element 38, the upper support element 40 being then secured to the lower support element 38 to form the assembled heat seal implement 10, thereby facilitating the assembly and repair of the heat seal implement 10 in a more efficient, more economical and relatively faster manner. As shown more clearly in FIG. 4, a cavity 50 is formed in a portion of the mating surface 42 of the lower support element 38, an opening 52 being formed through one end of the handle portion 26, generally opposite the end of the handle portion 26 formed integrally with the arm portions 28 and 30. The opening 52 intersects a portion of the cavity 50 formed in the lower support element 38. An opening 54 is formed through a portion of the arm extension 32, the opening 54 intersecting a portion of the cavity 50 and being positioned to provide communication between the cavity 50 and a portion of the roller receiving opening 36, as shown more clearly in FIG. 4. An opening 56 is formed in a portion of the arm extension 34, a portion of the opening 56 intersecting a portion of the cavity 50 and being positioned to provide communication between a portion of the cavity 50 and a portion of the roller receiving opening 36. The openings 54 and 56 are each sized to secure a portion of a bearing member therein in a non-rotating, assembled position, for reasons which will be made more apparent below.

The roller assembly 14, more particularly, comprises a cylindrically shaped roller base 60 having an opening 62 extending therethrough and intersecting the opposite ends thereof. The roller base 60 is, in a preferred form, constructed of a heat conductive material such as copper tubing, for example, thereby providing an efficient transfer of heat therethrough during the operation of the heat seal implement 10, for reasons which will be made more apparent below.

As shown more clearly in FIG. 4, a roller contacting surface 64 is formed about the outer periphery of the roller base 60, the outer peripheral surface of the roller contacting surface 64 rollingly engaging the wrapping material 20 during the operation of the heat seal implement 10. It should be noted that the thickness of the roller contacting surface 64 is exaggerated in FIG. 4 for the purpose of clarity of description, the thickness of the roller contacting surface 64 being in the range of approximately 0.002 inches to approximately 0.004 inches in one operational embodiment of the heat seal implement of the present invention.

The roller contacting surface 64 is constructed of a material substantially reducing the coefficient of friction determined between the wrapping material 20 and the wrapping material contacting portions of the heat seal implement 10 during the operation of the heat seal implement 10 or, more particularly, the outer peripheral surface of the roller contacting surface 64 has a relatively low coefficient of friction with respect to the wrapping material 20, thereby minimizing the tendency of the wrapping material 20 to stick or adhere to portions of the roller contacting surface 64 during the operation of the heat seal implement 10. More particularly, the roller contacting surface 64 is constructed of polyhalohydrocarbon which has a relatively low coefficient of friction. The particular polyhalohydrocarbon utilized to form the roller contacting surface 64 will depend upon the economics of manufacture, the desired characteristics of the selected polyhalohydrocarbon, the particular type of wrapping material to be heat sealed via the heat seal implement 10, and the predetermined operating temperature level. With reference more particularly to the utilization of heat seal implement 10 to heat seal a polyvinylchloride (PVC) type of wrapping material, mentioned before, it has been found that particular grades of a polytetrafluoroethylene provide a polyhalohydrocarbon having the desired qualities mentioned above.

In a preferred embodiment, the roller contacting surface 64 is constructed of a polytetrafluoroethylene of the type generally referred to in the art as a "tetrafluorocarbon resin" such as manufactured by E. I. duPont de Nemours & Co., Inc. of Wilmington, Delaware, and sold under the tradename of "TEFLON", the roller contacting surface 64 being constructed of a primer layer of tetrafluorocarbon resin of the type manufactured by E. I. duPont de Nemours & Co., Inc. of Wilmington, Delaware, and identified by the manufacturer's No. 850314 and a finish layer of tetrafluorocarbon resin of the type manufactured by E. I. duPont de Nemours & Co., Inc. of Wilmington, Delaware, and identified by the manufacturer's No. 851225, for example. In general, the first three numbers of the above-mentioned manufacturer's identifying numbers designate the particular grade of tetrafluorocarbon resin and the last three numbers designate the color or the like of the particular grade of tetrafluorocarbon.

Utilizing the materials of construction specifically identified above to construct the roller contacting surface 64, the outer peripheral surface of the roller base 60 is initially grit-blasted to provide a pitted-roughened surface and the primer layer of the tetrafluorocarbon resin is applied to the pitted-roughened surface, the thickness of the primer layer being preferably in the range of approximately 0.0005 inches to approximately 0.00075 inches. The primer layer is then cured at a temperature level of approximately 650° Fahrenheit to approximately 675° Fahrenheit. The finish layer of the tetrafluorocarbon resin is then applied to the cured primer layer and the finish layer is cured at a temperature level of approximately 750° Fahrenheit, the thickness of the finish layer being approximately 0.001 inches to approximately 0.0015 inches, in one preferred form, for example. It has been found that this particular material and method of applying the material to form the roller contacting surface 64 provide a satisfactory bond with respect to the roller base 60 constructed of a copper alloy or the like and provide a relatively friction free surface suitable for heat sealing a wrapping material constructed of polyvinylchloride (PVC).

As shown more clearly in FIG. 4, a bearing member 66 is secured in each end of the roller base 60, a portion of each bearing member 66 extending a distance through the opening 62 generally adjacent one end of the roller base 60 and being journally connected in this assembled position to the roller base 60. In this assembled position of the bearing member 66, a portion 68 of each bearing member 66 extends a distance axially beyond the adjacent end of the roller base 60. An opening 70 is formed axially through each bearing member 66 intersecting the opposite ends thereof, for reasons to be described in greater detail below.

The outer peripheral surface of the portions 68 of each bearing member 66 is formed on a flat to cooperate with a flat mating portion formed via the openings 54 and 56 to secure each bearing member 66 in a fixed, non-rotating position. Each portion 68 thus extends a distance through one of the openings 54 and 56 into a portion of the cavity 50 formed in the lower support element 38. More particularly, a portion of the lower support element 38 formed by the cavity 50 generally near the openings 54 and 56 engages and supports the portion 68 of the bearing member 66 extending therein, in an assembled position of the lower and the upper support elements 38 and 40. In one form, cavity portions (not shown) are also formed in the upper support element 40 positioned to matingly engage and cooperatively support the portions 68 of the bearing members 66, in an assembled operating position of the heat seal implement 10.

A heating element 72 is disposed and supported generally within the opening 62 of the roller base 60. The heating element 72 extends axially through the opening 62, one end of the heating element 72 extending through the opening 70 formed in one of the bearing members 66 and the opposite end of the heating element 72 extending through the opening 70 formed in the other bearing member 66. The opposite ends of the heating element 72 thus each extend through one of the openings 70 of the bearing members 66 and are each disposed within a portion of the cavity 50 formed in the lower support element 38, as shown more clearly in FIG. 4.

A conductor 74 is secured to one end of the heating element 72 and a conductor 76 is secured to the opposite end of the heating element 72, the conductors 74 and 76 forming a cable 78 for connecting the heating element 72 to and electrical energy source (diagrammatically and schematically shown in FIGS. 6 and 7) via a plug-type connector or the like, for example, as shown in FIG. 1, Each of the conductors 74 and 76 are supportingly disposed within a portion of the cavity 50 formed in the lower support element 38 and a portion of each of the conductors 74 and 76 is protectively encompassed via insulators 80. Each conductor 74 and 76 extends along a portion of the cavity 50 from one of the ends of the heating element 72, the two conductors 74 and 76 combining and extending through the portion of the cavity 50 formed in the handle portion 26 of the lower support element 38. The two conductors 74 and 76 extending along the cavity 50 formed in the handle portion 26 are protectively encompassed via an insulator 82, as shown in FIG. 4.

The heat seal implement 10 is thus constructed such that the heating element 72 can be assembled in the roller assembly 14 and the conductors 74 and 76, including the insulators 80 and 82 can be assembled about the conductors 72 and 74 prior to assembling the heat seal implement 10. The roller assembly 14 is then placed in an assembled position partially disposed within the roller receiving opening 36 and extending generally between the arm extensions 32 and 34, the portions 68 of the bearing members 66 each being secured within a portion of the cavity 50 formed in the lower support member 38, and the bearing members 66 journally and rotatingly supporting the roller base 60. The conductors 74 and 76 and the insulators 80 and 82 are then disposed within the cavity 50 and the cable 78 is extended through the opening 52 formed in the end of the handle portion 26, a retainer-washer securing the cable 78 in an assembled position within the handle portion 26, as shown in FIG. 4.

After assembling the roller assembly 54, the heating element 72, the conductors 74 and 76 and the insulators 80 and 82 in the lower support element 38, the upper support element 40 is then disposed on the lower support element 38 in an assembled position wherein the mating surfaces 42 and 44 engage, the lower and upper support elements 38 and 40 being then secured in an assembled position via screws, bolts or other such fastening elements. The two-piece construction of the roller support assembly 12 thus, not only facilitates the assembly of the heat seal implement, but also facilitates the repair or replacement of the various components and assemblies supported thereby since all of the supported elements and assemblies are exposed via simply unfastening the lower and the upper support elements 38 and 40.

The heat assembly 16 of the heat seal implement 10, more particularly, includes the heating element 72, conductors 74 and 76 and a heat control assembly 84, shown in one preferred embodiment in FIG. 6. The heating element 72 is a rod-shaped electrical resistance type of heating element such as manufactured by Watlow Electric Manufacturing Company of Hannibal, Missouri.

It has been found that in one particular operational embodiment of the present invention, a heating element having a power rating of 100 watts produces sufficient heat to heat the roller contacting surface 64 via the roller base 60 to an operating temperature level in the range of approximately 220° Fahrenheit to approximately 240° Fahrenheit which has been found to produce satisfactory results for heat sealing wrapping material of the polyvinylchloride (PVC) type, referred to before. However, it has also been found that utilizing a 100 watt heating element, the heat seal implement 10 requires approximately 30 minutes to 45 minutes to heat the roller contacting surface 64 to the required operating temperature level. Since the heat seal implement 10 is constructed to be particularly utilized to heat seal small mercantile items in a relatively fast and economical manner, it has been found necessary to utilize a heating element having a larger power rating such as 200 watts, for example, and to construct the heat control assembly 84 such that a larger quantity of heat can be supplied via the heating element 72 for initially heating the roller contacting surface 64 to the operating temperature level, the heat control assembly 84 subsequently reducing the heat supplied via the heating element 72 to maintain the roller contacting surface 64 substantially at the operating temperature level during the operation of the heat seal implement.

More particularly, the heat control assembly 84, as shown in FIG. 6, includes a switch 86 having an "off" switch position 88, a "start" switch position 90 and an "operate" switch position 92, the switch 86 being positioned in the various switch positions via a switch arm 94. The switch 84 is interposed in the cable 78 generally between the heating element 72 and an electrical energy source 96. The switch 84 interrupts electrical continuity between the heating element 72 and the electrical energy source 96 in the "off" position 88 of the switch arm 94, a start resistor 98 is interposed between the heating element 72 and the electrical energy source 96 in the "start" position 90 of the switch arm 94, and an operate resistor 100 is interposed between the heating element 72 and the electrical energy source 96 in the "operate" position 92 of the switch arm 94. The start resistor 98 has an electrical resistance sized such that the heating element 72 produces a relatively large amount of heat, 200 watts in one example, for initially heating the roller contacting surface 64 to the predetermined operating temperature level, and the operate reistor 100 has an electrical resistance sized such that the heating element 72 produces a sufficient amount of heat, 100 watts in one example, to maintain the roller contacting surface 64 at the predetermined operating temperature level.

A modified heat assembly 16a, having a modified heat control assembly 84a, is shown in FIG. 7. The heat control assembly 84a includes a variable resistor 102 for controlling the electrical resistance interposed generally between the heating element 72 and the electrical energy source 96, to position the heat seal implement 10a in a "start" position and an "operate" position for reasons and in a manner similar to that described before with respect to the heat control assembly 84, shown in FIG. 6.

In one form, the switch 86 or the control for the variable resistor 102 can be incorporated on the roller support assembly 12. Also, it should be noted that, in one other form, the heat control assembly of the heat seal implement can incorporate temperature sensors disposed to sense the temperature level of the roller contacting surface 64 and temperature controller receiving a signal in response to the sensed temperature level and automatically varying the electrical resistance interposed between the roller contacting surface 64 and the electrical energy source 96 to automatically maintain the temperature level of the roller contacting surface 64 at the predetermined operating temperature level, for example.

During the operation of the heat seal implement 10, the mercantile item 18 is wrappped with the wrapping material 20 and preferably in such a manner that a portion of the wrapping material 20 forms overlapping surfaces for sealing the wrapping material 20 generally about the mercantile item 18. The heat control assembly 84 or 84a of the heat seal implement 10 or 10a is then positioned in the start position, thereby positioning the heating element 72 to produce a maximum amount of heat. The heat porduced via the heating element 72 is transferred to the roller contacting surface 64 via the roller base 60.

When the temperature level of the roller contacting surface 64 reaches the predetermined operating temperature level, the heat control assembly is switched to the operating position. In this position, the heat seal implement 10 is positioned on the wrapped mercantile item 18 in an operating position wherein the heated roller contacting surface 64 engages the wrapping material 20, as diagrammatically shown in FIG. 5. The heat seal implement 10 is then moved via the operator rolling the roller contacting surface 64 generally over the wrapping material 20, thereby applying heat to the wrapping material 20 to heat seal the overlapping portions thereof sealingly packaging the mercantile item 18 within the wrapping material 20. Utilizing the wrapping material 20 of the polyvinylchloride (PVC) type, mentioned before, the heat applied via the heat seal implement 10 will also cause the wrapping material 20 to shrink, thereby shrink-fitting the wrapping material 20 generally about the mercantile item 18 and providing a fast, economical and efficient means for securely wrapping a small number of mercantile items such as books and the like. The adjustable posts 46 and 48 cooperate with the handle 26 to provide a support for supporting the heated roller assembly 14 above a supporting surface, thereby providing an assembly for supporting the heat seal implement 10 in a safe, elevated, non-operative position.

Changes may be made in the construction and the arrangement of the various parts or the elements of the various embodiments described herein or in the steps of the method described herein without departing from the spirit and the scope of the invention as defined in the following claims.

What is claimed is:

1. A heat seal implement for applying heat to portions of a heat sealable wrapping material, comprising:

a roller assembly, comprising:
  a cylindrically shaped roller base having an opening extending therethrough intersecting the opposite sides thereof;
  a roller contacting surface formed about the outer surface of the roller base contactable with the wrapping material constructed of a material substantially reducing adhesion between contacted portions of the wrapping material and the roller contacting surface; and,
  a bearing member connected to each end of the roller base;
roller support means rotatingly supporting said roller assembly, comprising:
  a lower support element, having an upwardly facing surface, a cavity formed in the upwardly facing surface, portions of the cavity engaging in supporting a portion of each bearing member; and,
  an upper support element, having a downwardly facing surface engaging the upwardly facing surface of the lower support element in an assembled position and cooperating with the lower support element to form the roller support means, a portion of the assembled upper and lower support elements forming a handle portion in the assembled position; and,
means heating the roller contacting surface, comprising:
  a heating element extending through a portion of the opening through the roller base; and,
  conductor means connected to the heating element and connectable to an electrical energy source for supplying electrical energy to the heating element when in electrical communication therewith, a portion of the conductor means disposed within a portion of the cavity of the lower support element.

2. The heat seal implement of claim 1 wherein the roller contacting surface is defined further as being constructed of polyhalohydrocarbon.

3. The heat seal implement of claim 2 wherein the polyhalohydrocarbon is a tetrafluorocarbon resin.

4. The heat seal implement of claim 1 wherein the means heating the roller contacting surface is defined further to include:
heat control means positionable in a start position heating the roller contacting surface to a predetermined operating temperature level and positionable in an operating position maintaining the temperature level of the roller contacting surface generally at the predetermined operating temperature level.

5. The heat seal implement of claim 1 wherein the roller base is defined further as being constructed of a heat conductive material.

6. The heat seal implement of claim 1 defined further to include: post means adjustably secured to a portion of the roller support means having a portion cooperating with a portion of the roller support means to support the roller assembly in an elevated position.

* * * * *